United States Patent
Kim et al.

(10) Patent No.: US 11,786,965 B1
(45) Date of Patent: Oct. 17, 2023

(54) MOTOR PLATE TYPE COIL FORMING APPARATUS

(71) Applicants: HYUNDAI MOTOR COMPANY, Seoul (KR); KIA CORPORATION, Seoul (KR); DR AXION CO., LTD., Busan (KR)

(72) Inventors: Kyoung Young Kim, Hwaseong-si (KR); Ji Hun Son, Hwaseong-si (KR); Ja Uk Koo, Yangsan-si (KR); Sangbum Kim, Busan (KR); Kimyoung Kwon, Busan (KR)

(73) Assignees: HYUNDAI MOTOR COMPANY, Seoul (KR); KIA CORPORATION, Seoul (KR); DR AXION CO., LTD., Busan (KR)

( * ) Notice: Subject to any disclaimer, the term of this patent is extended or adjusted under 35 U.S.C. 154(b) by 0 days.

(21) Appl. No.: 17/974,597

(22) Filed: Oct. 27, 2022

(30) Foreign Application Priority Data

May 30, 2022 (KR) .......................... 10-2022-0066281

(51) Int. Cl.
*B22D 17/00* (2006.01)
*H02K 15/04* (2006.01)
*B22D 17/04* (2006.01)
*B22D 17/20* (2006.01)

(52) U.S. Cl.
CPC ........... *B22D 17/002* (2013.01); *B22D 17/04* (2013.01); *B22D 17/2038* (2013.01); *H02K 15/045* (2013.01)

(58) Field of Classification Search
CPC ... B22D 17/002; B22D 17/04; B22D 17/2038
See application file for complete search history.

(56) References Cited

FOREIGN PATENT DOCUMENTS

EP 3208013 A1 * 8/2017

* cited by examiner

*Primary Examiner* — Kevin P Kerns
*Assistant Examiner* — Steven S Ha
(74) *Attorney, Agent, or Firm* — LEMPIA SUMMERFIELD KATZ LLC

(57) ABSTRACT

A motor plate type coil forming apparatus forms a plate type coil wound on a stator of a motor by a squeeze casting method. In particular, the apparatus includes: i) a main frame including a lower frame and an upper frame; ii) a mold unit including a lower mold elastically connected to the lower frame to be movably installed in a vertical direction, and an upper mold movably installed in the upper frame in the vertical direction corresponding to the lower mold; and iii) a molten metal pressurizing unit including a plunger that is movably installed in the lower frame in a vertical direction corresponding to the lower mold. In particular, the lower mold may include a sleeve provided to be vertically coupled to the plunger, and a plurality of coil forming parts provided to form a cavity connected to the sleeve.

17 Claims, 14 Drawing Sheets

MOTOR PLATE TYPE COIL FORMING APPARATUS

CROSS-REFERENCE TO RELATED APPLICATION

This application claims priority to and the benefit of Korean Patent Application No. 10-2022-0066281 filed in the Korean Intellectual Property Office on May 30, 2022, the entire contents of which are incorporated herein by reference.

BACKGROUND

(a) Field

The present disclosure relates to a motor plate type coil forming apparatus, and more particularly, to a motor plate type coil forming apparatus that manufactures a plate type coil wound on a stator of a motor.

(b) Description of the Related Art

Generally, a hybrid vehicle or an electric vehicle called an environment-friendly vehicle utilizes a technology that generates driving torque by a driving motor.

The driving motor includes a stator and a rotor. The stator includes a stator core and a stator coil wound around the stator core.

The stator coil may be divided into a circular coil having a circular cross-section and a prismatic coil having a square cross-section according to a cross-sectional shape of the coil. Recently, a plate type coil has been developed as a method to increase a space factor of the coil.

As a method of forming such a plate type coil, a method of mechanically processing a base material of a copper material and a casting method using a molten metal of a copper material are applied.

However, the processing method is disadvantageous in terms of cost and productivity. We have discovered that the casting method may cause deterioration in the quality of the plate type coil due to internal pores, unfilled molten metal, and sand sintering.

The above information disclosed in this Background section is only to enhance understanding of the background of the present disclosure, and therefore it may contain information that does not form the prior art that is already known to a person of ordinary skill in the art.

SUMMARY

The present disclosure provides a motor plate type coil forming apparatus that may reduce or minimize internal defects and external defects of a plate type coil by forming the plate type coil by a squeeze casting method.

An embodiment of the present disclosure provides a motor plate type coil forming apparatus that is configured to form a plate type coil wound on a stator of a motor by a squeeze casting method. The motor plate type coil forming apparatus includes: i) a main frame including a lower frame and an upper frame; ii) a mold unit including a lower mold elastically connected to the lower frame to be movably installed in a vertical direction, and an upper mold movably installed in the upper frame in the vertical direction corresponding to the lower mold; and iii) a molten metal pressurizing unit including a plunger that is movably installed in the lower frame in a vertical direction corresponding to the lower mold. In particular, the lower mold may include a sleeve provided to be vertically coupled to the plunger, and a plurality of coil forming parts provided to form a cavity connected to the sleeve.

The cavity may be disposed at an upper side of the sleeve, and molten metal is injected into the cavity.

The upper mold may include an upper core inserted into the cavity of the lower mold and may be configured to press the lower mold in a downward direction.

The upper mold may press the lower mold in a downward direction by driving of a mold driving part.

The molten metal pressurizing unit may primarily press the molten metal injected into the cavity through a plunger of a stationary state fitted into the sleeve.

The molten metal pressurizing unit may secondarily press the molten metal through the plunger that is moved in an upward direction by driving of a plunger driving part.

The mold driving part may be installed in the upper frame and may include a first driving cylinder connected to the upper mold.

The plunger driving part may be installed in the lower frame and may include a second driving cylinder connected to the plunger.

The motor plate type coil forming apparatus may further include a vacuum generating unit connected to the lower mold.

The motor plate type coil forming apparatus may further include a mold heating unit connected to the lower mold and circulating heated oil to the lower mold.

The lower mold may include a base frame that is movably coupled to a plurality of guide rods extending upward on the upper surface of the lower frame in a vertical direction, and a plurality of springs respectively mounted on the plurality of guide rods between the base frame and the lower frame.

The lower mold may include a first mold main body that is fixed to the base frame and in which the sleeve is formed in a vertical direction, and a plurality of slide cores that include the plurality of coil forming parts, respectively, and that are slidably coupled to an upper portion of the first mold main body.

Each of the plurality of coil forming parts may include a forming groove formed in each of the plurality of slide cores in a shape corresponding to the plate type coil.

Each of the plurality of slide cores may include a core body connected to a core driving part, and a core block including each of the plurality of coil forming parts and provided to be mounted to and detached from the core body.

The plurality of slide cores may include a first slide core and a second slide core that slide in opposite directions, and a third slide core that slides in a direction crossing the moving directions of the first and second slide cores.

The upper mold may include a second mold main body that includes an upper core inserted into the cavity and that is connected to a mold driving part.

The upper core may include a fork-shaped core rib.

The plurality of coil forming parts may be partitioned by the upper core to form a molten metal runner connected to the sleeve in the cavity.

The mold heating unit may include an oil heater that heats oil, and an oil circulating line connected to the oil heater and installed inside the lower mold.

According to the embodiments of the present disclosure, it is possible to improve internal quality and external quality of a plate type coil by forming the plate type coil by a squeeze casting method.

In addition, effects that may be obtained or expected from embodiments of the present disclosure are directly or suggestively described in the following detailed description. Further areas of applicability should become apparent from the description provided herein. It should be understood that the description and specific examples are intended for purposes of illustration only and are not intended to limit the scope of the present disclosure.

BRIEF DESCRIPTION OF THE DRAWINGS

The embodiments herein may be better understood by referring to the following description in conjunction with the accompanying drawings in which like reference numerals indicate identically or functionally similar elements, of which.

It should be understood that the above-referenced drawings are not necessarily to scale, presenting a somewhat simplified representation of various features illustrative of the basic principles of the present disclosure. The specific design features of the present disclosure, including, for example, specific dimensions, orientations, locations, and shapes, should be determined in part by the particular intended application and use environment.

DETAILED DESCRIPTION

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It should be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "coupled" denotes a physical relationship between two components whereby the components are either directly connected to one another or indirectly connected via one or more intermediary components.

As used herein, the term "and/or" includes any and all combinations of one or more of the associated listed items. When a component, device, element, or the like of the present disclosure is described as having a purpose or performing an operation, function, or the like, the component, device, or element should be considered herein as being "configured to" meet that purpose or to perform that operation or function.

It is understood that the term "vehicle," "vehicular," "car," or other similar terms as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum).

Hereinafter, embodiments of the present disclosure are described in detail with reference to the accompanying drawings.

Figure 1A:
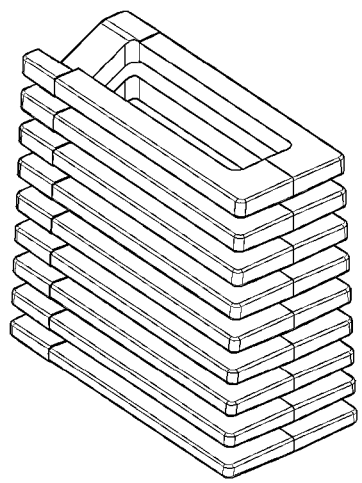
FIG. 1A and FIG. 1B illustrate plate type coils in an embodiment of the present disclosure.
Figure 1B:
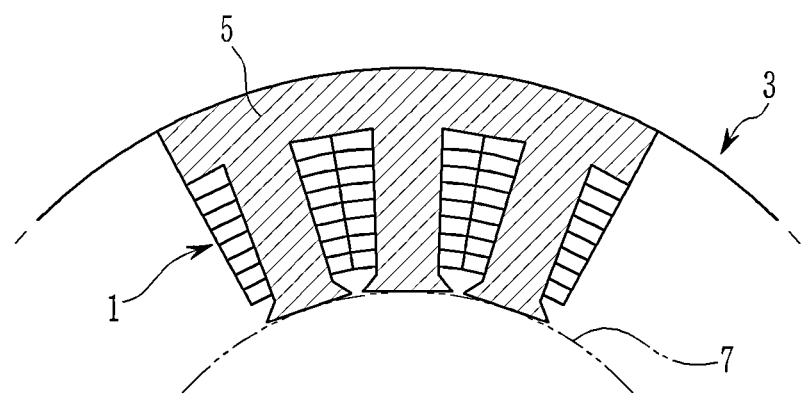

FIG. 1A and FIG. 1B illustrate plate type coils in an embodiment of the present disclosure.

Referring to FIG. 1A and FIG. 1B, a plate type coil 1 in an embodiment of the present disclosure may be applied to a driving motor 3. For example, the driving motor 3 may be applied to a hybrid vehicle and/or an electric vehicle as an environment-friendly vehicle that obtains driving force with electrical energy.

Here, the driving motor 3 includes a stator 5, and a rotor 7 disposed with a predetermined gap from the stator 5. For example, the driving motor 3 may include a permanent magnet synchronous motor (PMSM).

The plate type coil 1 is provided as a stator coil wound around the stator 5, and the plate type coil 1 is provided in a shape in which a quadrangular plate is coiled. The plate type coil 1 may be formed of a high-purity copper material. Such a high-purity copper material has a short temperature range changing from a liquid phase to a solid phase.

It should be understood that the scope of the present disclosure is not limited to the plate type coil 1 wound on the stator 5 of the driving motor 3 for a vehicle, and the technical idea of the present disclosure may be applied as long as it is a plate type coil applied to a driving motor of various types and uses.

Figure 2:
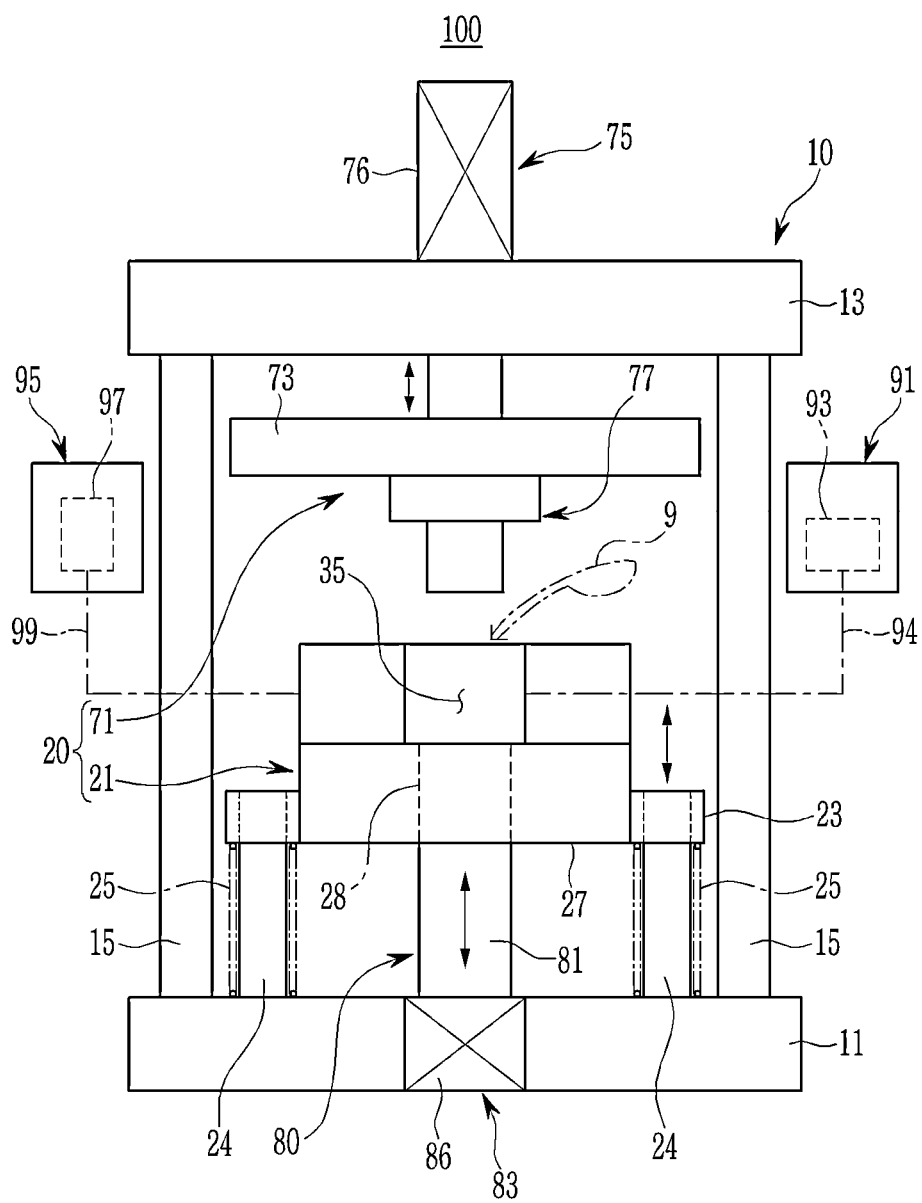
FIG. 2 schematically illustrates a block diagram of a motor plate type coil forming apparatus according to an embodiment of the present disclosure.

FIG. 2 schematically illustrates a block diagram of a motor plate type coil forming apparatus according to an embodiment of the present disclosure.

Referring to FIG. 1A, FIG. 1B, and FIG. 2, a motor plate type coil forming apparatus 100 according to an embodiment of the present disclosure may be applied to a process of forming the plate type coil 1 among a plurality of processes for manufacturing the driving motor 3.

In one embodiment, the motor plate type coil forming apparatus 100 may form the plate type coil 1 by a casting method using a molten copper material.

In the present specification, an 'upper end portion', 'upper portion', 'upper end', or 'upper surface' of an constituent element represents an end portion, portion, end, or surface of the constituent element that is relatively upper in the drawing, and a 'lower end portion', 'lower portion', 'lower end', or 'lower surface' of an constituent element represents an end portion, portion, end, or surface of the constituent element that is relatively lower in the drawing.

In addition, in the present specification, an end of a constituent element (for example, one end or the other end) represents an end of the constituent element in any one direction, and an end portion of a constituent element (for example, one end portion or the other end portion) represents a portion of the constituent element that includes the end.

The motor plate type coil forming apparatus 100 has a structure that may reduce or minimize internal defects and external defects of the plate type coil 1 by forming the plate type coil 1 by a squeeze casting method.

Referring to FIG. 1A, FIG. 1B, and FIG. 2, the motor plate type coil forming apparatus 100 includes a main frame 10, a mold unit 20, a molten metal pressurizing unit 80, a vacuum generating unit 91, and a mold heating unit 95.

In the embodiment of the present disclosure, the main frame 10 is installed along a vertical direction on a floor of a process work site.

The main frame 10 includes a lower frame 11, an upper frame 13, and a plurality of vertical frames 15 connected to the lower frame 11 and the upper frame 13 along the vertical direction.

In the embodiment of the present disclosure, the mold unit 20 has a structure in which a molten metal 9 of a copper material may be injected into a forming space having a shape corresponding to the plate type coil 1, the molten metal 9 is solidified, and the plate type coil 1 is manufactured. The mold unit 20 includes a lower mold 21 and an upper mold 71.

The lower mold 21 is elastically connected to the lower frame 11 and movably installed in the vertical direction. In addition, the upper mold 71 is installed in the upper frame 13 to be able to move in the vertical direction corresponding to the lower mold 21.

Figure 3:
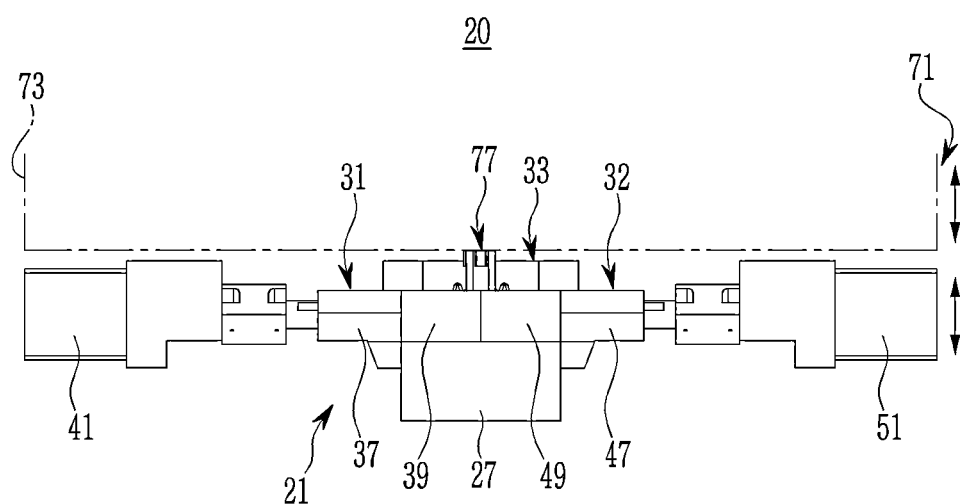
FIG. 3 illustrates a front view of a mold unit applied to a motor plate type coil forming apparatus according to an embodiment of the present disclosure.
Figure 4:
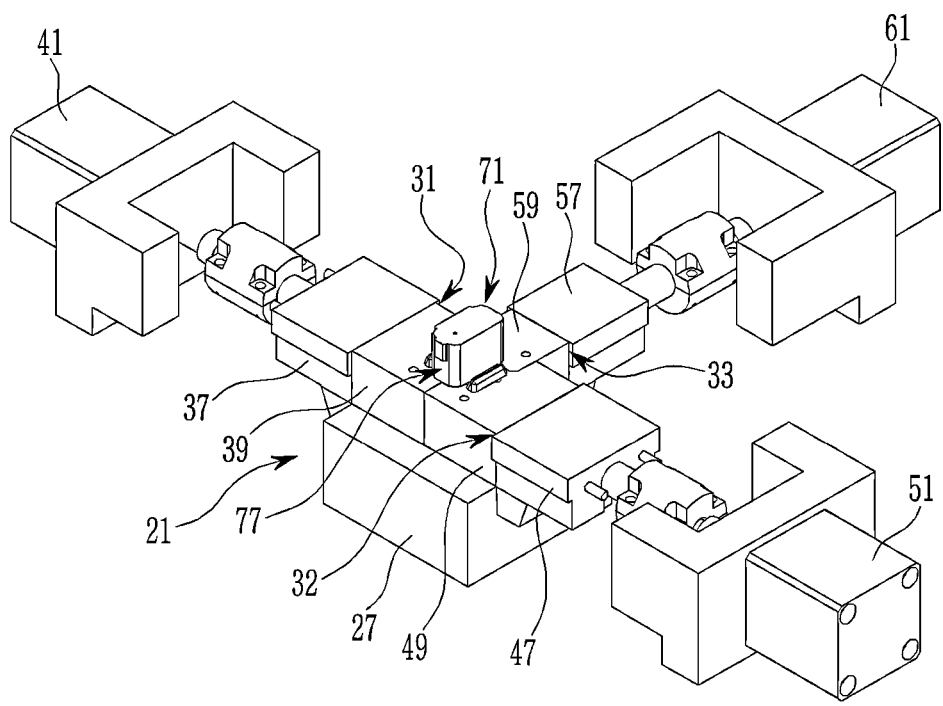
FIG. 4 and FIG. 5 illustrate perspective views of a mold unit applied to a motor plate type coil forming apparatus according to an embodiment of the present disclosure.
Figure 5:
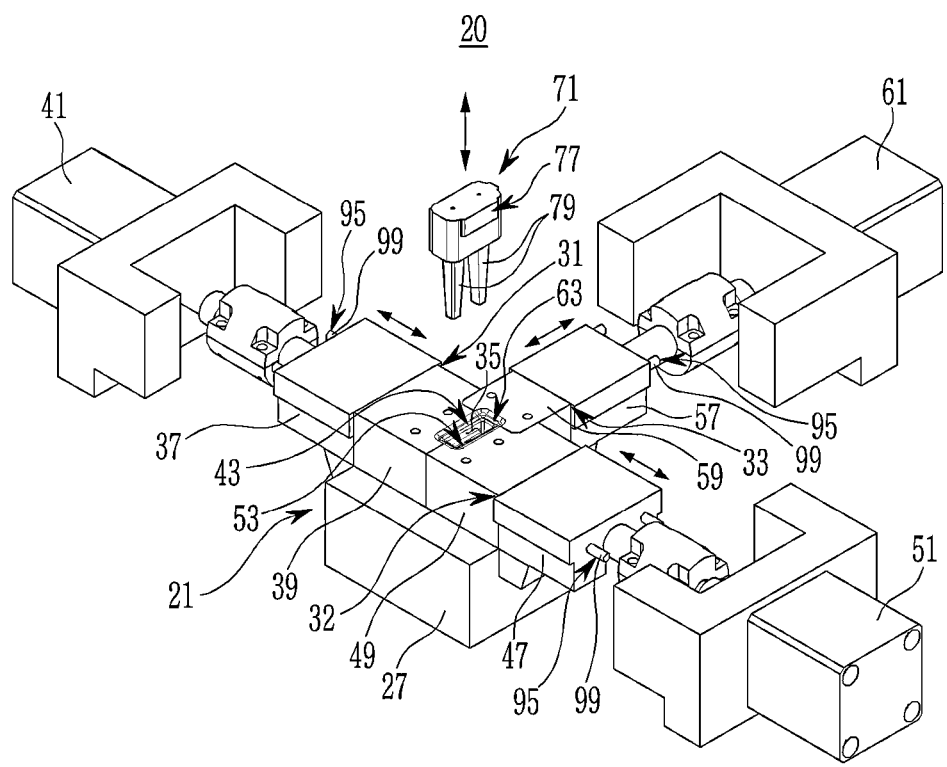

FIG. 3 illustrates a front view of a mold unit applied to a motor plate type coil forming apparatus according to an embodiment of the present disclosure, and FIG. 4 and FIG. 5 illustrate perspective views of a mold unit applied to a motor plate type coil forming apparatus according to an embodiment of the present disclosure.

Referring to FIG. 2 to FIG. 5, in the embodiment of the present disclosure, the lower mold 21 includes a base frame 23, a plurality of springs 25, a first mold main body 27, and a plurality of slide cores 31, 32, and 33.

The base frame 23 is vertically movably coupled to a plurality of guide rods 24 extending upward from an upper surface of the lower frame 11 of the main frame 10.

The plurality of springs 25 are configured to elastically support the base frame 23 between the base frame 23 and the lower frame 11. Each of the plurality of springs 25 is mounted on each of the plurality of guide rods 24.

Figure 6:
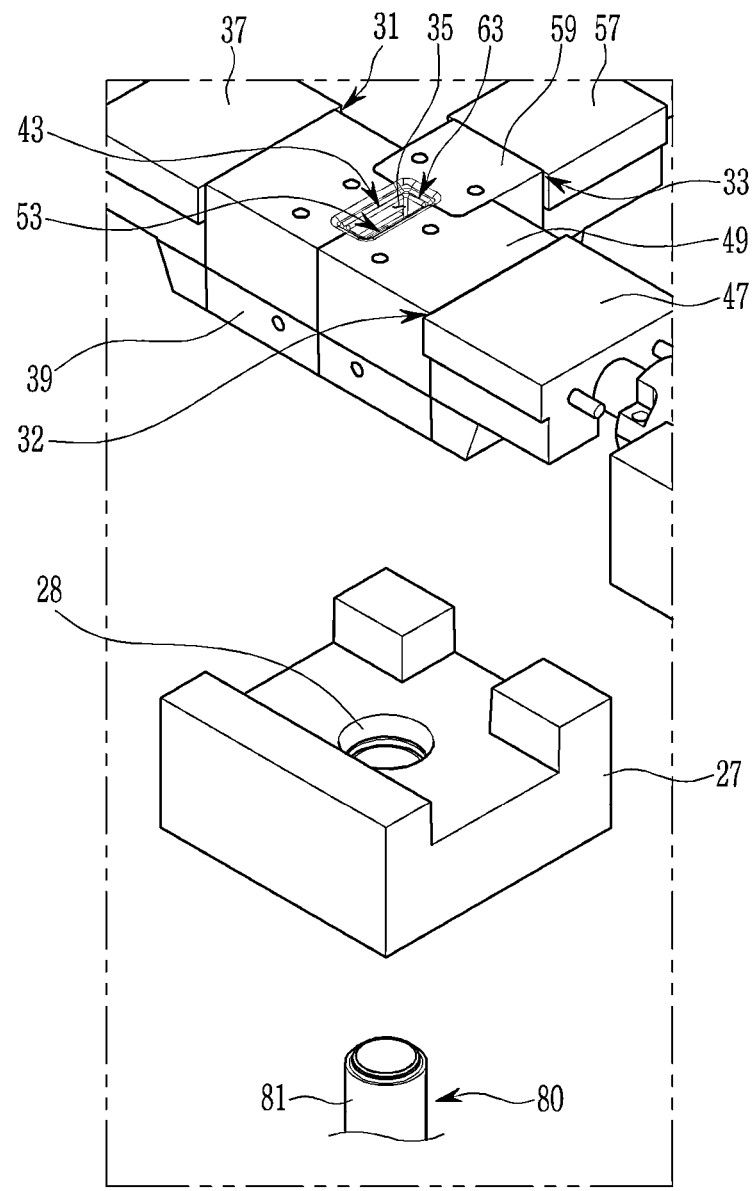
FIG. 6, FIG. 7A, and FIG. 7B illustrate schematic views of a lower mold of a mold unit applied to a motor plate type coil forming apparatus according to an embodiment of the present disclosure.
Figure 7A:
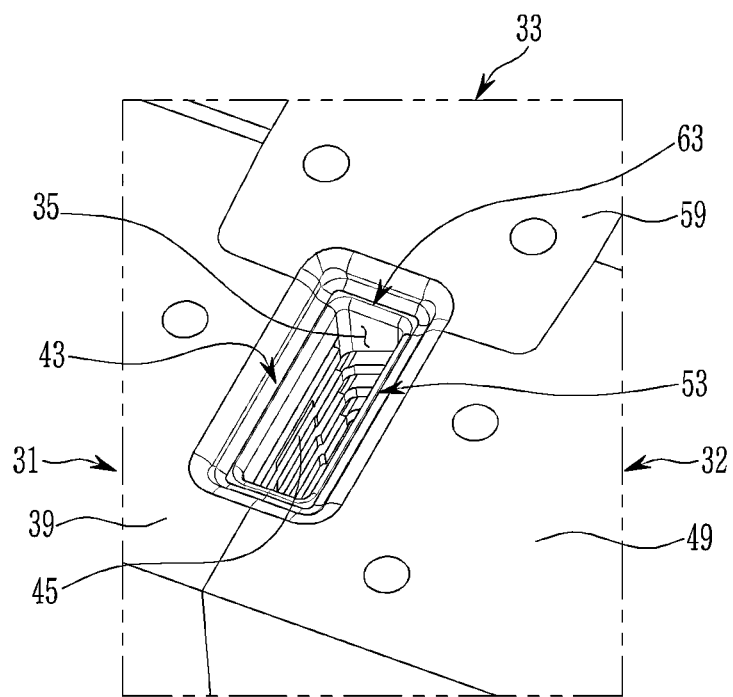
Figure 7B:
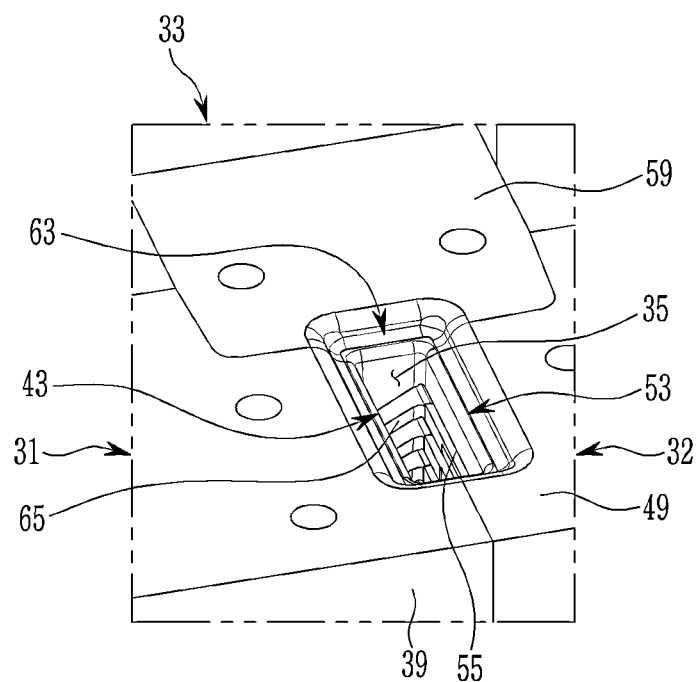

FIG. 6, FIG. 7A, and FIG. 7B illustrate schematic views of a lower mold of a mold unit applied to a motor plate type coil forming apparatus according to an embodiment of the present disclosure.

Referring to FIG. 2 to FIG. 7, the first mold main body 27 is fixed to the base frame 23. The first mold main body 27 includes a sleeve 28 penetrating in the vertical direction.

The plurality of slide cores 31, 32, and 33 are slidably coupled to the upper portion of the first mold main body 27 in a planar direction.

The plurality of slide cores 31, 32, and 33 may slide in a direction closer to each other on the upper surface of the first mold main body 27. The plurality of slide cores 31, 32, and 33 may form a cavity 35 connected to the sleeve 28.

The plurality of slide cores 31, 32, and 33 include a plurality of coil forming parts 43, 53, and 63 configured to form the cavity 35. The plurality of coil forming parts 43, 53, and 63 are referred to as a first coil forming part 43, a second coil forming part 53, and a third coil forming part 63, respectively.

Here, the cavity 35 is disposed at an upper side of the sleeve 28, and the molten copper material 9 may be injected into the cavity 35.

The plurality of slide cores 31, 32, and 33 may include, in one example, a first slide core 31, a second slide core 32, and a third slide core 33.

The first slide core 31 and the second slide core 32 may be slide-moved in a straight direction facing each other on the upper surface of the first mold main body 27. In addition, the third slide core 33 may be slidably moved in a straight line direction intersecting the movement directions of the first slide core 31 and the second slide core 32 on the upper surface of the first mold main body 27.

The first slide core 31 includes a first core body 37 and a first core block 39.

The first core body 37 is connected to a first core driving part 41. The first core driving part 41 is fixed to the base frame 23 and connected to the first core body 37. In one example, the first core driving part 41 may include a working cylinder that moves the first core body 37 forward and backward by hydraulic pressure.

The first core block 39 is connected to the first core body 37 and further slidably coupled to the upper surface of the first mold main body 27. The first core block 39 includes the first coil forming part 43. The first coil forming part 43 includes a first forming groove 45 formed in a shape corresponding to a portion of the plate type coil 1 (see FIG. 1A and FIG. 1B).

The second slide core 32 includes a second core body 47 and a second core block 49.

The second core body 47 is connected to a second core driving part 51. The second core driving part 51 is fixed to the base frame 23 and further connected to the second core body 47. In one example, the second core driving part 51 may include a working cylinder that moves the second core body 47 forward and backward by hydraulic pressure.

The second core block 49 is connected to the second core body 47 and further slidably coupled to the upper surface of the first mold main body 27. The second core block 49 includes the second coil forming part 53. The second coil forming part 53 includes a second forming groove 55 formed in a shape corresponding to another portion of the plate type coil 1.

The third slide core 33 includes a third core body 57 and a third core block 59.

The third core body 57 is connected to a third core driving part 61. The third core driving part 61 is fixed to the base frame 23 and further connected to the third core body 57. In one embodiment, the third core driving part 61 may include a working cylinder that moves the third core body 57 forward and backward by hydraulic pressure.

The third core block 59 is connected to the third core body 57 and further slidably coupled to the upper surface of the first mold main body 27. The third core block 59 includes the third coil forming part 63. The third coil forming part 63 includes a third forming groove 65 formed in a shape corresponding to another portion of the plate type coil 1.

The first slide core 31, the second slide core 32, and the third slide core 33 are respectively moved in a direction closer to each other by respective driving of the first core driving part 41, the second core driving part 51, and the third core driving part 61.

Accordingly, the first coil forming part 43, the second coil forming part 53, and the third coil forming part 63 are combined with each other to form the cavity 35 connected to the sleeve 28 of the first mold main body 27.

Furthermore, each of the first core block 39, the second core block 49, and the third core block 59 may be provided to be mounted (for example, coupled) and to be detached to each to the first core body 37, the second core body 47, and the third core body 57.

Here, each of the first coil forming part 43, the second coil forming part 53, and the third coil forming part 63 may be damaged and broken by the high-temperature molten metal 9 injected into the cavity 35.

In this case, the first core block 39, the second core block 49, and the third core block 59 may be easily replaced by the first core body 37, the second core body 47, and the third core body 57, respectively.

Referring to FIG. 2 to FIG. 5, in the embodiment of the present disclosure, the upper mold 71 includes a second mold main body 73.

The second mold main body 73 is movably installed in the upper frame 13 in the vertical direction corresponding to the lower mold 21. The second mold main body 73 may be moved in the vertical direction by driving of a mold driving part 75.

Furthermore, the second mold main body 73 may be moved in a downward direction by the driving of the mold driving part 75 and may close an upper portion of the cavity 35 while being combined with the lower mold 21. In addition, the second mold main body 73 may press the lower mold 21 downward.

The second mold main body 73 is connected to the mold driving part 75. The mold driving part 75 may include a first driving cylinder 76 installed in the upper frame 13. The first driving cylinder 76 is connected to the second mold main body 73 along the vertical direction. The first driving cylinder 76 may move forward and backward along the vertical direction by hydraulic pressure and may move the second mold main body 73 in the vertical direction.

Figure 8:
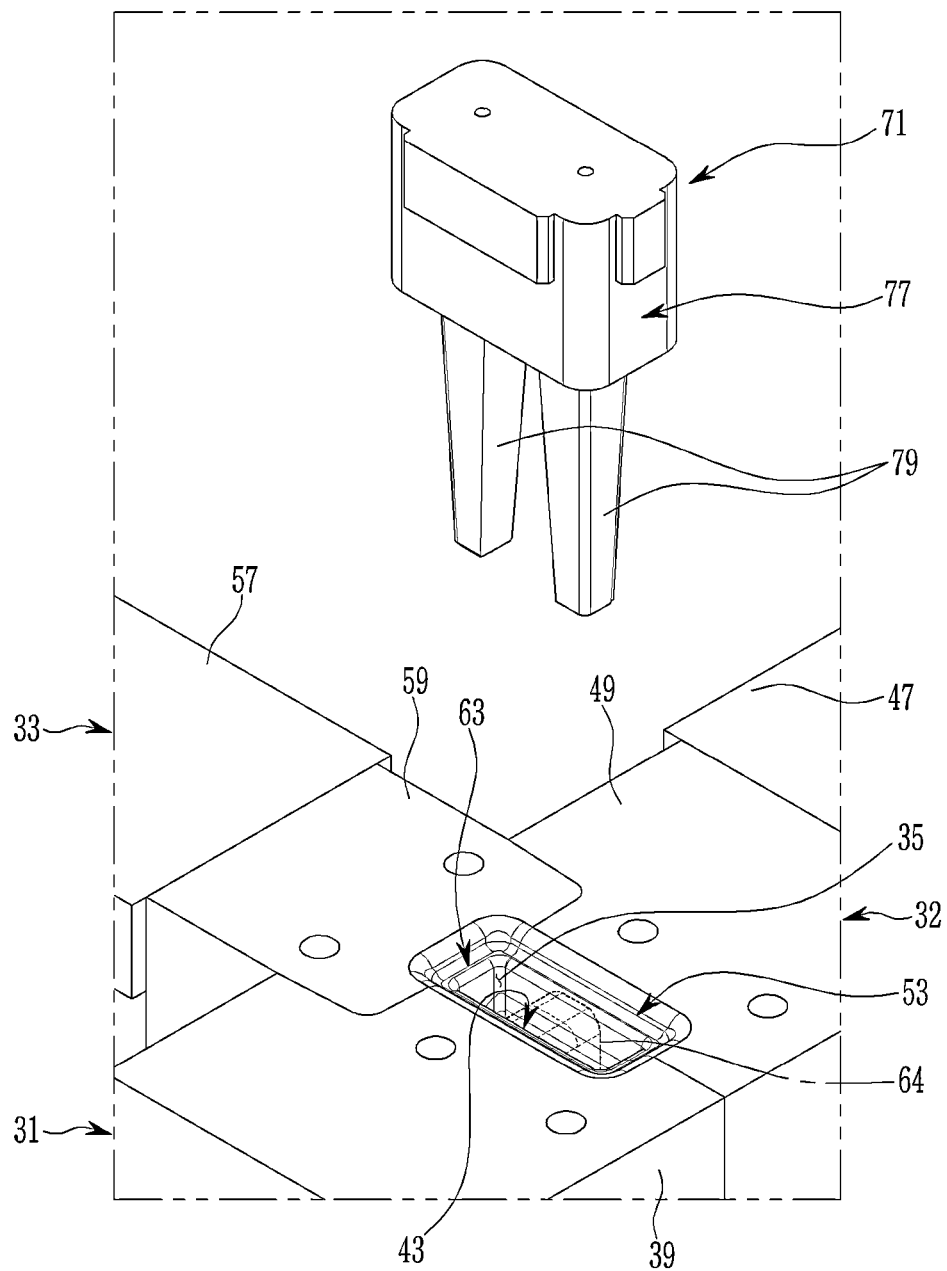
FIG. 8 and FIG. 9 illustrate schematic views of a lower mold of a mold unit applied to a motor plate type coil forming apparatus according to an embodiment of the present disclosure.
Figure 9:
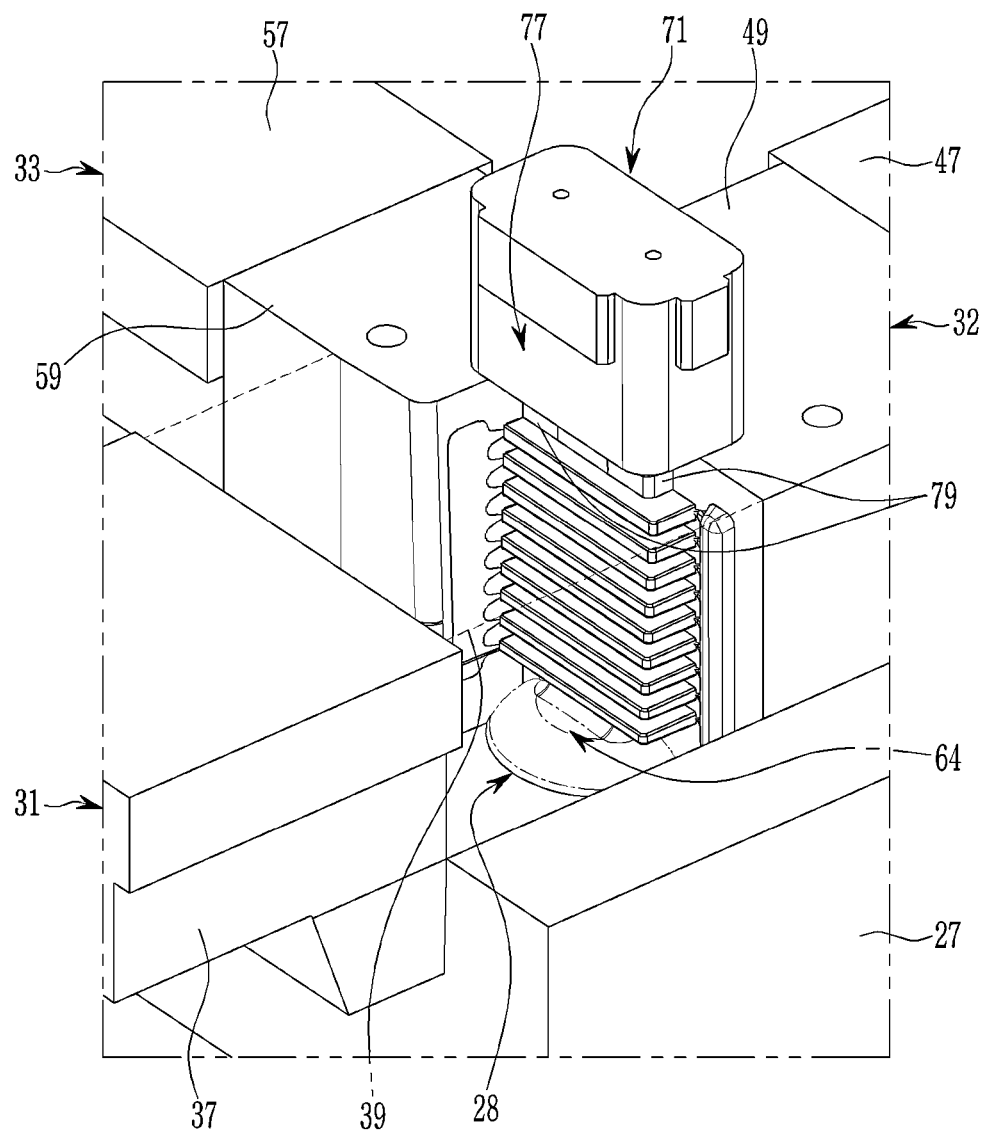

As shown in FIG. 8 and FIG. 9, the second mold main body 73 includes an upper core 77 inserted into the cavity 35 of the lower mold 21.

The upper core 77 is mounted under the second mold main body 73. The upper core 77 is configured to close an upper portion of the cavity 35. In addition, the upper core 77 is configured to form a forming space of a shape corresponding to the plate type coil 1 between the first coil forming part 43, the second coil forming part 53, and the third coil forming part 63 in the cavity 35.

The upper core 77 may include, in one embodiment, a fork-shaped core rib 79. The core rib 79 is disposed inside the cavity 35 formed by the first coil forming part 43, the second coil forming part 53, and the third coil forming part 63.

Here, the first coil forming part 43, the second coil forming part 53, and the third coil forming part 63 may form a molten metal runner 64 partitioned by the core rib 79 in the cavity 35. That is, the molten metal runner 64 may be defined as a passage in the cavity 35 excluding the core rib 79.

The molten metal runner 64 is a passage through which the molten metal 9 flows. The molten metal runner 64 is connected to the sleeve 28 of the first mold main body 27 along the vertical direction.

Referring to FIG. 2 and FIG. 4, in the embodiment of the present disclosure, the molten metal pressurizing unit 80 is configured to press the molten metal 9 injected into the cavity 35 of the lower mold 21 along the vertical direction.

Here, the molten metal pressurizing unit 80 is configured to primarily press the molten metal 9 through the sleeve 28 of the first mold main body 27 with a pressing force acting in the downward direction on the lower mold 21 through the upper mold 71.

In addition, the molten metal pressurizing unit 80 is configured to secondarily pressurize the molten metal 9 with external force (for example, pressing force acting in an upward direction) acting on the sleeve 28 of the first mold main body 27.

The molten metal pressurizing unit 80 includes a plunger 81 installed in the lower frame 11 to be movable in the vertical direction corresponding to the lower mold 21.

The plunger 81 is coupled along the vertical direction to the sleeve 28 of the first mold main body 27 at a lower side of the lower mold 21. In addition, the plunger 81 may be moved in the vertical direction by driving of a plunger driving part 83.

Furthermore, the plunger 81 may primarily press the molten metal 9 inside the cavity 35 with a pressing force applied to the lower mold 21 through the upper mold 71 in a stationary state.

That is, in a state (for example, in a stationary state) in which the plunger 81 is inserted into the sleeve 28, when the lower mold 21 is moved downward by the pressing force of the upper mold 71, the plunger 81 may press the molten metal 9 through the sleeve 28.

Furthermore, the plunger 81 may move upwardly through the sleeve 28 by the driving of the plunger driving part 83 and may secondarily press the molten metal 9 inside the cavity 35.

The plunger 81 is connected to the plunger driving part 83. The plunger driving part 83 may include a second driving cylinder 86 installed in the lower frame 11. The second driving cylinder 86 is connected to the plunger 81 along the vertical direction. The second driving cylinder 86 may move forward and backward along the vertical direction by hydraulic pressure and may move the plunger 81 in the vertical direction.

Referring to FIG. 2, in the embodiment of the present disclosure, the vacuum generating unit 91 is configured to generate a vacuum pressure set inside the cavity 35 of the lower mold 21. The vacuum generating unit 91 is connected to the lower mold 21.

The vacuum generating unit 91 may include a vacuum pump 93 that is well known to those skilled in the art, and a vacuum generating line 94 substantially connected to the vacuum pump 93 and the cavity 35. In one example, the vacuum generating line 94 may be connected to an overflow area of the cavity 35.

Referring to FIG. 2 and FIG. 5, in the embodiment of the present disclosure, the mold heating unit 95 is configured to heat the lower mold 21 at a predetermined temperature or more. In one example, the mold heating unit 95 is configured to circulate oil heated at a predetermined temperature to the lower mold 21.

The mold heating unit 95 is connected to the lower mold 21. The mold heating unit 95 may include an oil heater 97 and an oil circulating line 99.

The oil heater 97 is configured to heat the oil. The oil circulating line 99 connects the oil heater 97 and the lower mold 21, and circulates the oil heated by the oil heater 97 into the lower mold 21.

In the lower mold 21, the oil circulating line 99 may be installed inside each of the first slide core 31, the second slide core 32, and the third slide core 33.

Hereinafter, an operation of the motor plate type coil forming apparatus according to the embodiment of the present disclosure configured as described above is described in detail with reference to FIG. 1 to FIG. 9 and the accompanying drawings.

Figure 10:
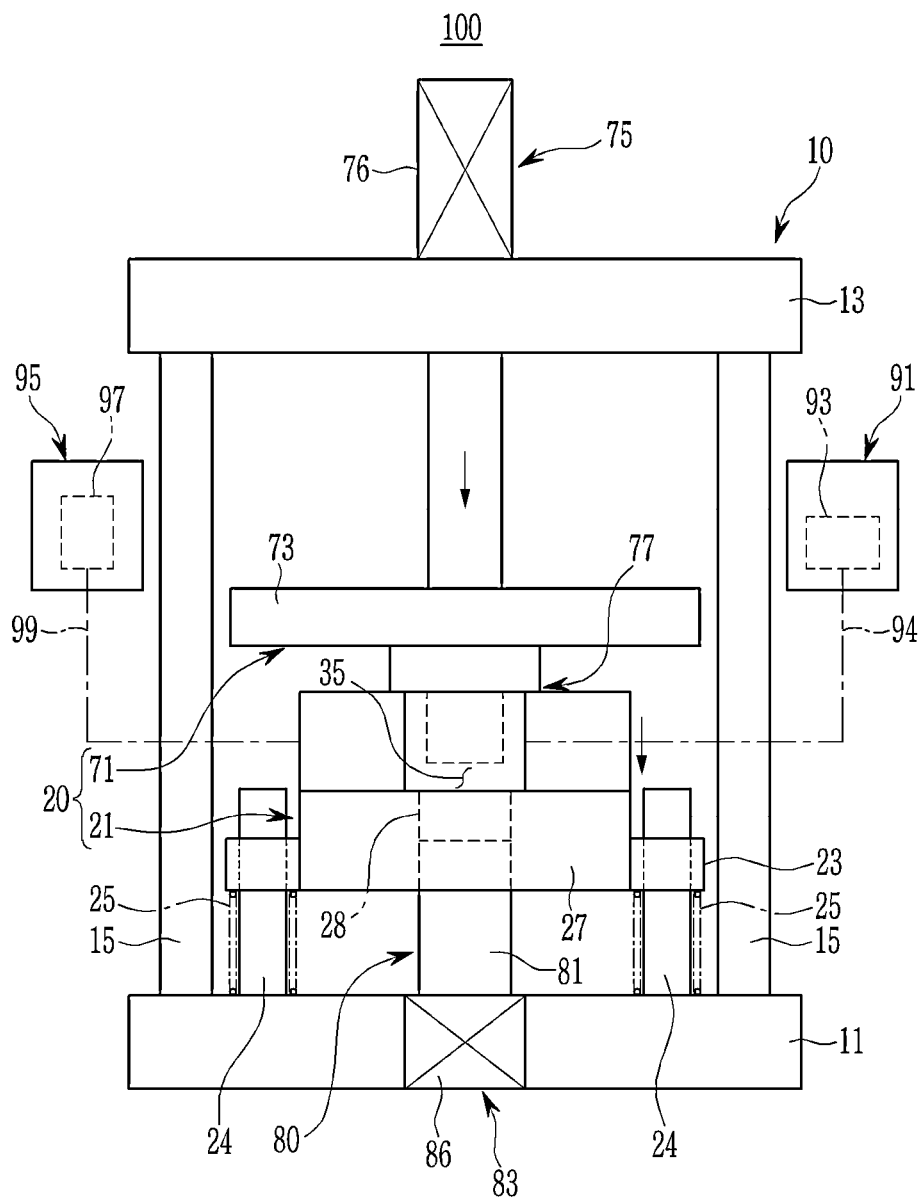
FIG. 10 to FIG. 12 illustrate an operation of a motor plate type coil forming apparatus of the motor according to an embodiment of the present disclosure.
Figure 11:
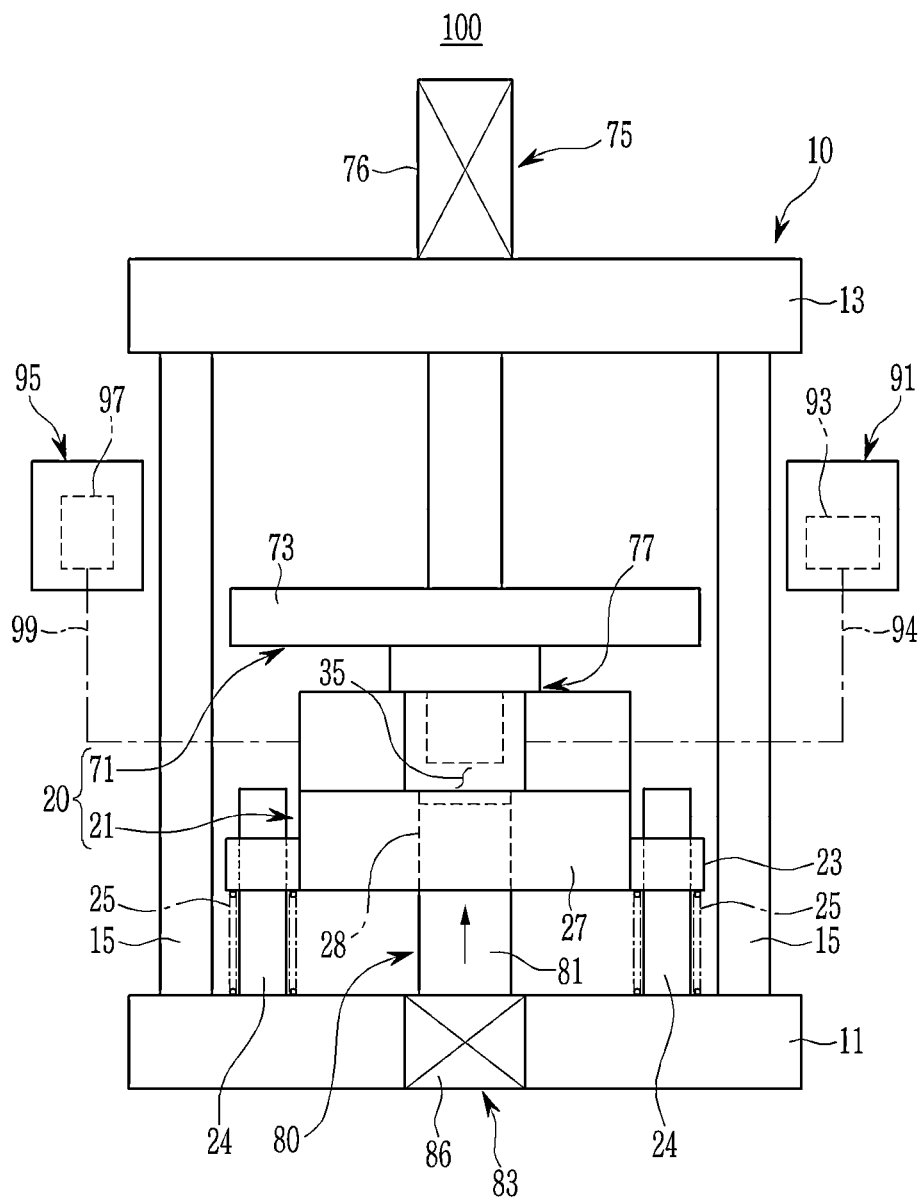
Figure 12:
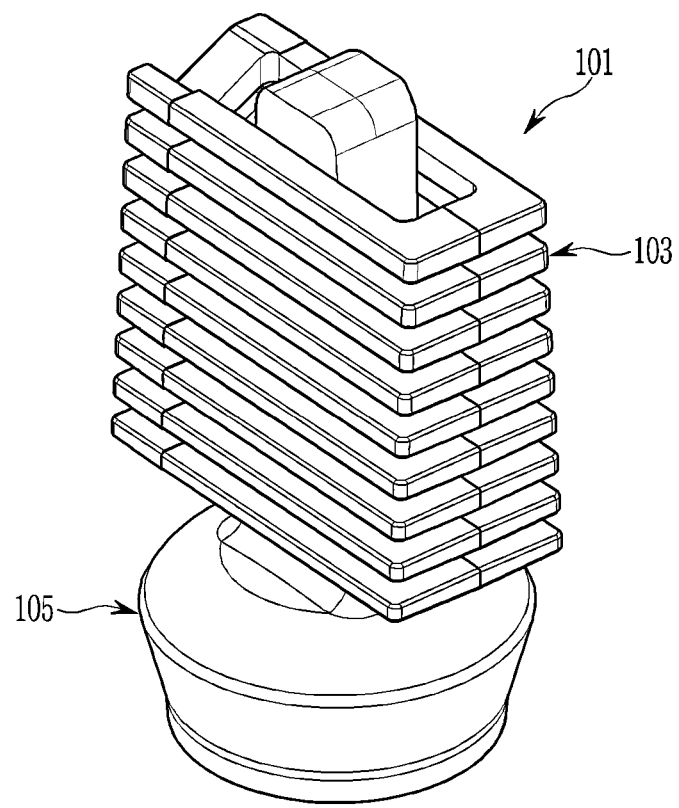

FIG. 10 to FIG. 12 illustrate drawings for explaining an operation of a motor plate type coil forming apparatus of the motor according to an embodiment of the present disclosure.

First, referring to FIG. 1 to FIG. 9, the upper mold 71 of the mold unit 20 is moved in the upward direction by the driving of the mold driving part 75.

The lower mold 21 of the mold unit 20 is in a state of being moved upward through the plurality of guide rods 24 by the elastic force of the plurality of springs 25.

Here, the plunger 81 of the molten metal pressurizing unit 80 closes the lower portion of the sleeve 28 of the first mold main body 27 of the lower mold 21 at the lower side of the lower mold 21.

In this state, the first slide core 31, the second slide core 32, and the third slide core 33 of the lower mold 21 are respectively slide-moved (for example, forward-moved) in a direction that is closer to each other, on the upper surface of the first mold main body 27.

The first slide core 31, the second slide core 32, and the third slide core 33 are respectively move forward by respective driving of the first core driving part 41, the second core driving part 51, and the third core driving part 61.

Then, the first coil forming part 43, the second coil forming part 53, and the third coil forming part 63 of the first slide core 31, the second slide core 32, and the third slide core 33 are combined with each other to form the cavity 35.

Here, the cavity 35 is disposed at the upper side of the sleeve 28 of the first mold main body 27 and is connected to the sleeve 28 along the vertical direction.

Then, the molten metal 9 is injected into the cavity 35. In this case, the molten metal 9 is accommodated in the sleeve 28 of the first mold main body 27 through the cavity 35 and is accommodated in a portion of the cavity 35.

Next, the second mold main body 73 of the upper mold 71 is moved downward by the driving of the mold driving part 75.

Accordingly, the second mold main body 73 closes the upper portion of the cavity 35 through the upper core 77 while being combined with the lower mold 21. At the same time, the core rib 79 of the upper core 77 is inserted into the cavity 35. The core rib 79 forms a forming space having a shape corresponding to the plate type coil 1 inside the cavity 35.

Alternatively, the molten metal 9 may be injected into the cavity 35 in the state in which the core rib 79 is inserted into the cavity 35.

Meanwhile, the vacuum pump 93 of the vacuum generating unit 91 is driven to generate a vacuum pressure set inside the cavity 35 through the vacuum generating line 94.

Then, the oil heater 97 of the mold heating unit 95 heats the oil and circulates it into the lower mold 21 through the oil circulating line 99. Accordingly, the lower mold 21 is heated by the heated oil and maintained at a predetermined temperature or higher.

In the state as described above, as shown in FIG. 10, the second mold main body 73 of the upper mold 71 continues to move downward by the driving of the mold driving part 75.

Then, the upper mold 71 applies a pressure acting in the downward direction to the lower mold 21. Accordingly, the lower mold 21 overcomes the elastic force of the plurality of springs 25 to move downward through the plurality of guide rods 24. Here, the upper mold 71 is moved downward by the stroke set by the driving of the mold driving part 75 and then is stopped.

As described above, as the lower mold 21 is moved downward, the plunger 81 in a stationary state is fitted into the sleeve 28 of the first mold main body 27 of the lower mold 21. Accordingly, the plunger 81 primarily presses the molten metal 9 inside the cavity 35 through the sleeve 28 with the pressing force applied to the lower mold 21 by the upper mold 71.

Next, as shown in FIG. 11, the plunger 81 is moved by the stroke set in the upward direction through the sleeve 28 by the driving of the plunger driving part 83. Then, the plunger 81 secondarily presses the molten metal 9 inside the cavity 35 through the sleeve 28.

Here, as the molten metal 9 inside the cavity 35 is primarily and secondarily pressed through the plunger 81 as described above, the molten metal 9 is filled into the forming space inside the cavity 35 through the sleeve 28.

In this case, the molten metal 9 is stably filled in the forming space through the molten metal runner 64. The molten metal runner 64 may reduce or minimize a filling movement distance of the molten metal 9.

On the other hand, as described above, the molten metal 9 filled in the forming space inside of the cavity 35 is solidified for a predetermined time. In this case, the molten metal 9 is solidified into a shape corresponding to the plate type coil 1 by each of the first coil forming part 43, the second coil forming part 53, and the third coil forming part 63.

In this state, the plunger 81 is lowered to its original position through the sleeve 28 by the driving of the plunger driving part 83.

At the same time, the upper mold 71 is moved upward by the driving of the mold driving part 75. In addition, the lower mold 21 is moved upward through the plurality of guide rods 24 by the elastic restoring force of the plurality of springs 25.

Then, the first slide core 31, the second slide core 32, and the third slide core 33 of the lower mold 21 are moved (for example, moving backward) to be away from each other by the respective driving of the first core driving part 41, the second core driving part 51, and the third core driving part 61.

The first slide core 31, the second slide core 32, and the third slide core 33 may be respectively move backward by respective driving of the first core driving part 41, the second core driving part 51, and the third core driving part 61.

Next, an ejector (not shown) known to those skilled in the art ejects a molten metal solidified body 101 having a shape corresponding to the plate type coil 1 as shown in FIG. 12.

Here, the molten metal solidified body 101 is integrally formed with a first portion 103 corresponding to the shape of the plate type coil 1 and a second portion 105 corresponding to the shape of the molten metal runner 64.

Finally, when the second portion 105 is removed from the first portion 103, the forming (for example, manufacturing) of the plate type coil 1 as shown in FIG. 1 is completed.

According to the motor plate type coil forming apparatus 100 according to the embodiment of the present disclosure as described so far, the plate type coil 1 of the stator 5 provided in the driving motor 3 may be formed by the squeeze casting method.

According to the motor plate type coil forming apparatus 100 according to the embodiment of the present disclosure, since the molten metal 9 inside the cavity 35 is pressed in two stages through the plunger 81, it is possible to reduce or minimize the shrinkage pores generated when the molten metal 9 is solidified.

In addition, according to the motor plate coil forming apparatus 100 according to the embodiment of the present disclosure, since the vacuum pressure set inside the cavity 35 is formed through the vacuum generating unit 91, it is possible to reduce or minimize the inflow (for example, mixing) of air inside the cavity 35.

Therefore, according to the motor plate coil forming apparatus 100 according to the embodiment of the present disclosure, by reducing or minimizing the pore defects of the plate type coil 1, it is possible to improve the internal quality and the external quality of the plate type coil 1.

Furthermore, according to the motor plate coil forming apparatus 100 according to the embodiment of the present disclosure, it is possible to shorten or minimize the filling movement distance of the molten metal 9 through the molten metal runner 64 inside the cavity 35.

In addition, according to the motor plate coil forming apparatus 100 according to the embodiment of the present disclosure, the lower mold 21 into which the molten metal 9 is injected may be maintained at a predetermined temperature or higher through the mold heating unit 95.

Thus, according to the motor plate coil forming apparatus 100 according to the embodiment of the present disclosure, it is possible to improve the fluidity and cavity filling properties of the molten copper 9 made of the copper material having a short temperature range changing from a liquid phase to a solid phase, and it is possible to further improve the internal and external qualities of the plate type coil 1.

Furthermore, according to the motor plate coil forming apparatus 100 according to the embodiment of the present disclosure, it is possible to easily replace some parts of the lower mold 21 in contact with the molten metal 9.

Accordingly, according to the motor plate coil forming apparatus 100 according to the embodiment of the present disclosure, even if some parts of the lower mold 21 are damaged or broken by the high-temperature molten metal 9, since only some parts may be replaced, it is possible to reduce equipment maintenance costs.

While this present disclosure has been described in connection with what is presently considered to be practical embodiments, it is to be understood that the present disclosure is not limited to the disclosed embodiments. On the contrary, it is intended to cover various modifications and equivalent arrangements included within the spirit and scope of the present disclosure.

DESCRIPTION OF SYMBOLS

1: plate type coil 3: driving motor
5: stator 7: rotor
9: molten metal 10: main frame
11: lower frame 13: upper frame
15: vertical frame 20: mold unit
21: lower mold 23: base frame
24: guide rod 25: spring
27: first mold main body 28: sleeve
31: first slide core 32: second slide core
33: third slide core 35: cavity
37: first core body 39: first core block
41: first core driving part 43: first coil forming part
45: first forming groove 47: second core body
49: second core block 51: second core driving part
53: second coil forming part 55: second forming groove
57: third core body 59: third core block
61: third core driving part 63: third coil forming part
64: molten metal runner 65: third forming groove
71: upper mold 73: second mold main body
75: mold driving part 76: first driving cylinder
77: upper core 79: core rib
80: molten metal pressurizing unit 81: plunger
83: plunger driving part 86: second driving cylinder
91: vacuum generating unit 93: vacuum pump
94: vacuum generating line 95: mold heating unit
97: oil heater 99: oil circulating line
100: motor plate type coil forming apparatus
101: molten metal solidified body
103: first portion 105: second portion

What is claimed is:

1. A motor plate coil forming apparatus for forming a plate coil wound on a stator of a motor, the motor plate coil forming apparatus comprising:
   a main frame including a lower frame and an upper frame;
   a mold unit including:
      a lower mold elastically connected to the lower frame to be movably installed in a vertical direction, and
      an upper mold movably installed in the upper frame in the vertical direction corresponding to the lower mold; and
   a molten metal pressurizing unit including a plunger movably installed in the lower frame in the vertical direction corresponding to the lower mold,
   wherein the lower mold includes a sleeve vertically coupled to the plunger, and a plurality of coil forming parts provided to form a cavity connected to the sleeve.

2. The motor plate coil forming apparatus of claim 1, wherein
   the cavity is disposed at an upper side of the sleeve, and molten metal is injected into the cavity.

3. The motor plate coil forming apparatus of claim 1, wherein
   the upper mold includes an upper core inserted into the cavity of the lower mold the upper mold configured to press the lower mold in a downward direction.

4. The motor plate coil forming apparatus of claim 3, wherein
   the upper core includes a fork-shaped core rib.

5. The motor plate coil forming apparatus of claim 3, wherein
   the plurality of coil forming parts are partitioned by the upper core and configured to form a molten metal runner connected to the sleeve in the cavity.

6. The motor plate coil forming apparatus of claim 1, wherein
   the upper mold presses the lower mold in a downward direction by driving of a mold driving part, and
   the molten metal pressurizing unit primarily presses molten metal injected into the cavity through a plunger of a stationary state fitted into the sleeve.

7. The motor plate coil forming apparatus of claim 6, wherein
   the molten metal pressurizing unit secondarily presses the molten metal through the plunger that is moved in an upward direction by driving of a plunger driving part.

8. The motor plate coil forming apparatus of claim 7, wherein
   the mold driving part is installed in the upper frame and includes a first driving cylinder connected to the upper mold, and
   the plunger driving part is installed in the lower frame and includes a second driving cylinder connected to the plunger.

9. The motor plate coil forming apparatus of claim 1, further comprising:
   a vacuum generating unit connected to the lower mold.

10. The motor plate coil forming apparatus of claim 1, further comprising:
a mold heating unit connected to the lower mold and configured to circulate heated oil to the lower mold.

11. The motor plate coil forming apparatus of claim 10, wherein
the mold heating unit includes:
an oil heater configured to heat oil, and
an oil circulating line connected to the oil heater and installed inside of the lower mold.

12. The motor plate coil forming apparatus of claim 1, wherein
the lower mold includes:
a base frame that is movably coupled to a plurality of guide rods extending upward on an upper surface of the lower frame in a vertical direction, and
a plurality of springs respectively mounted on the plurality of guide rods between the base frame and the lower frame.

13. The motor plate coil forming apparatus of claim 12, wherein
the lower mold includes:
a first mold main body that is fixed to the base frame and in which the sleeve is formed in a vertical direction, and
a plurality of slide cores that include the plurality of coil forming parts, respectively, the plurality of slide cores slidably coupled to an upper portion of the first mold main body.

14. The motor plate coil forming apparatus of claim 13, wherein
each of the plurality of coil forming parts includes:
a forming groove formed in each of the plurality of slide cores in a shape corresponding to the plate coil.

15. The motor plate coil forming apparatus of claim 13, wherein
each of the plurality of slide cores includes:
a core body connected to a core driving part, and
a core block including a coil forming part of the plurality of coil forming parts and provided to be mounted to and detached from the core body.

16. The motor plate coil forming apparatus of claim 13, wherein
the plurality of slide cores includes:
a first slide core and a second slide core that slide in opposite directions, and
a third slide core that slides in a direction crossing the moving directions of the first and second slide cores.

17. The motor plate coil forming apparatus of claim 1, wherein
the upper mold includes
a first mold main body including an upper core inserted into the cavity, the second mold main body connected to a mold driving part.

* * * * *